US012699562B2

(12) United States Patent
Bouley et al.

(10) Patent No.: US 12,699,562 B2
(45) Date of Patent: Aug. 4, 2026

(54) WORKFLOW TEMPLATES FOR CONFIGURATION PACKAGES

(71) Applicant: FAIR ISAAC CORPORATION, Roseville, MN (US)

(72) Inventors: Ken Bouley, Point Reyes Station, CA (US); Bruno Courbage, San Rafael, CA (US); Sathya Sekar, Bangalore (IN)

(73) Assignee: Fair Isaac Corporation, Minneapolis, MN (US)

( * ) Notice: Subject to any disclaimer, the term of this patent is extended or adjusted under 35 U.S.C. 154(b) by 222 days.

(21) Appl. No.: 18/297,786

(22) Filed: Apr. 10, 2023

(65) Prior Publication Data

US 2023/0281011 A1 Sep. 7, 2023

Related U.S. Application Data

(63) Continuation of application No. 17/483,580, filed on Sep. 23, 2021, now Pat. No. 11,650,816, which is a
(Continued)

(51) Int. Cl.
  *G06F 8/70* (2018.01)
  *G06F 8/60* (2018.01)
  *G06F 8/76* (2018.01)
(52) U.S. Cl.
  CPC . *G06F 8/76* (2013.01); *G06F 8/60* (2013.01)
(58) Field of Classification Search
  CPC ......................................................... G06F 8/70
  See application file for complete search history.

(56) References Cited

U.S. PATENT DOCUMENTS

| | | | |
|---|---|---|---|
| 5,497,334 A | 3/1996 | Russell et al. | |
| 5,517,645 A | 5/1996 | Stutz et al. | |

(Continued)

OTHER PUBLICATIONS

Andreas Schraitle. "Provisioning of Customizable Pattern-based Software Artifacts into Cloud Environments", Institute of Architecture of Application Systems, University of Stuttgart, Stuttgart, Germany, Sep. 6, 2013, pp. 1-111) (Year: 2013).
(Continued)

*Primary Examiner* — Jae U Jeon
(74) *Attorney, Agent, or Firm* — Mintz, Levin, Cohn. Ferris, Glovsky and Popeo, P.C.; F. Jason Far-hadian, Esq.

(57) ABSTRACT

Systems, machines, methods and products for generating a configured software solution using one or more configuration packages. A decision service may be configured to generate decision data based on a configuration package comprising user-generated input, a collection of configurations, and a decision flow template. The user-generated input may be used for selecting an artifact from an artifact library in a configuration database. The collection of configurations may be infused, dynamically, into the decision flow template. The decision flow template may be exposed for user modification. The decision flow template may be integrated into the configuration package in association with at least one configurable decision element and a user configuration selected from the collection of configurations for specifying one or more parameters in the artifact. The artifact and the user configuration may be combined with the decision flow template to generate the configured software solution.

20 Claims, 6 Drawing Sheets

Related U.S. Application Data continuation-in-part of application No. 17/206,637, filed on Mar. 19, 2021, now Pat. No. 11,392,374, which is a continuation of application No. 16/231, 168, filed on Dec. 21, 2018, now Pat. No. 10,956,152, which is a continuation of application No. 14/940, 133, filed on Nov. 12, 2015, now Pat. No. 10,162,630.

(60) Provisional application No. 62/078,325, filed on Nov. 11, 2014.

(56) References Cited

U.S. PATENT DOCUMENTS

| | | | |
|---|---|---|---|
| 6,615,199 B1 | 9/2003 | Bowman-Amuah | |
| 6,931,599 B1 | 8/2005 | Korenshtein | |
| 7,272,820 B2 | 9/2007 | Klianev | |
| 7,665,064 B2 | 2/2010 | Able et al. | |
| 7,827,528 B2 | 11/2010 | Sattler et al. | |
| 8,386,525 B2 | 2/2013 | Pace et al. | |
| 8,417,715 B1 | 4/2013 | Bruckhaus et al. | |
| 8,417,938 B1 | 4/2013 | Considine et al. | |
| 8,584,087 B2 | 11/2013 | Rasch et al. | |
| 9,588,790 B1 | 3/2017 | Wagner et al. | |
| 9,690,575 B2 | 6/2017 | Prismon et al. | |
| 10,620,854 B1* | 4/2020 | James | G06F 3/067 |
| 10,853,178 B1 | 12/2020 | Pan et al. | |
| 2002/0104068 A1 | 8/2002 | Barrett et al. | |
| 2002/0182579 A1* | 12/2002 | Driscoll | G09B 7/02 |
| | | | 434/350 |
| 2003/0191730 A1* | 10/2003 | Adkins | G06F 9/453 |
| | | | 702/186 |
| 2003/0229543 A1 | 12/2003 | Zimmerman et al. | |
| 2005/0021381 A1 | 1/2005 | Schnoerer et al. | |
| 2005/0085937 A1 | 4/2005 | Goodwin et al. | |
| 2005/0278348 A1 | 12/2005 | Falter et al. | |
| 2007/0061428 A1* | 3/2007 | Haley | G06F 16/972 |
| | | | 707/E17.117 |
| 2007/0220022 A1 | 9/2007 | Lankinen et al. | |
| 2008/0126712 A1 | 5/2008 | Mizushima | |
| 2008/0172673 A1 | 7/2008 | Naik | |
| 2008/0209392 A1 | 8/2008 | Able et al. | |
| 2008/0307211 A1 | 12/2008 | An et al. | |
| 2009/0257436 A1 | 10/2009 | Qu | |
| 2010/0125541 A1* | 5/2010 | Wendel | G06F 9/451 |
| | | | 715/710 |
| 2010/0306772 A1 | 12/2010 | Arnold et al. | |
| 2010/0333083 A1 | 12/2010 | Chancey et al. | |
| 2012/0185821 A1 | 7/2012 | Yaseen et al. | |
| 2013/0006707 A1 | 1/2013 | Ssubhanjan | |
| 2013/0046585 A1 | 2/2013 | Bang et al. | |
| 2013/0239089 A1 | 9/2013 | Eksten et al. | |
| 2014/0052773 A1 | 2/2014 | Deng et al. | |
| 2014/0075032 A1 | 3/2014 | Vasudevan et al. | |
| 2014/0075033 A1 | 3/2014 | Doering et al. | |
| 2014/0143735 A1 | 5/2014 | Dahn | |
| 2014/0244799 A1 | 8/2014 | Kundgol et al. | |
| 2014/0250306 A1 | 9/2014 | Ziegler | |
| 2014/0278807 A1 | 9/2014 | Bohacek | |
| 2015/0058467 A1 | 2/2015 | Douglas et al. | |
| 2015/0067171 A1 | 3/2015 | Yum et al. | |
| 2015/0113160 A1 | 4/2015 | Sun et al. | |
| 2015/0156280 A1 | 6/2015 | Vaswani et al. | |
| 2015/0157226 A1 | 6/2015 | Strahl et al. | |
| 2015/0205602 A1 | 7/2015 | Prismon et al. | |
| 2017/0075669 A1 | 3/2017 | Charters et al. | |
| 2017/0091150 A1* | 3/2017 | Palanivelu | G06F 40/143 |
| 2017/0308793 A1 | 10/2017 | Prismon et al. | |
| 2017/0308822 A1 | 10/2017 | Prismon et al. | |
| 2018/0246960 A1 | 8/2018 | Rathod | |

OTHER PUBLICATIONS

Azarmi, Bahaaldine. "Scalable Big Data Architecture: A Practitioners Guide to Choosing Relevant Big Data Architecture", Apress, Berkeley, Originally Published Dec. 30, 2015, pp. 1-142. (Year: 2015).

*Decision Model and Notation*. Object Management Group, 2015. 182 pages.

Fallon, L. et al. (2014). "Applying Semantics to Optimize End-User Services in Telecommunication Networks", OTM Confederated International Conferences, "On the Move to Meaningful Internet Systems", Springer, Berlin, Heidelberg, 2014, pp. 1-10.

Garcia, Bernat Ribes. "OpenDaylight SDN controller platform", Escola Tecnica d'Enginyeria de Telecomunicacioneselona, Universitat Politecnica de Catalunya, Barcelona, Oct. 2015, pp. 1-170. (Year: 2015).

Gronroos, Marko. "Book of Vaadin", Vaadin 7 Edition, 6th Revision, Vaadin Ltd, Sep. 21, 2015, pp. 1-753. (Year: 2015) [PDF pp. 1-400].

Gronroos, Marko. "Book of Vaadin", Vaadin 7 Edition, 6th Revision, Vaadin Ltd, Sep. 21, 2015, pp. 1-753. (Year: 2015) [PDF pp. 401-756].

Hatcliff, John, et al., "Cadena: An Integrated Development, Analysis, and Verification Environment for Component-based Systems", ICSE '03, Portland, OR, May 3-10, 2003, 13 pages.

Hinkelmann, Knut et al. "The Knowledge Work Designer—Modelling Process Logic and Business Logic", GI-Edition Lecture Notes in Informatics, Modellierung 2016, Workshopband, Mar. 2-4, 2016, pp. 135-139. (Year: 2016).

Jayasinghe, Deepal, et. al. "Improving Performance and Availability of Services Hosted on IaaS Clouds with Structural Constraint-Aware Virtual Machine Placement." *2011 International Conference on Services Computing*, IEEE. pp. 72-79.

Lau, Kung-Kiu, et al., "Software Component Models", IEEE Transactions on Software Engineering, vol. 33, No. 10, Oct. 2007, pp. 709-724.

Li, Jim, et. al. "Fast Scalable Optimization to Configure Service Systems Having Cost and Quality of Service." *Proceedings of the 6th International Conference on Automatic Computing*, Jun. 15-19, 2009, Barcelona Spain, pp. 159-168.

Salatino et al. "Mastering JBoss Drools 6", Packt Publishing Open Source, Birmingham, Mar. 31, 2016, pp. 1-308) (Year: 2016).

* cited by examiner

100

110 — User Configuration

120 — Configuration Package

130 — Decision Template

140 — Configured Decision Service

WORKFLOW TEMPLATES FOR CONFIGURATION PACKAGES

CROSS-REFERENCE TO RELATED APPLICATIONS

The current application is continuation and claims the benefit of the earlier filing date and priority to U.S. application Ser. No. 17/483,580, filed on Sep. 23, 2021, which is a continuation-in-part of and claims the benefit of the earlier filing date and priority to U.S. application Ser. No. 17/206, 637, filed on Mar. 19, 2021, which in turn claims priority to U.S. application Ser. No. 16/231,168, filed on Dec. 21, 2018, which in turn claims priority to U.S. application Ser. No. 14/940,133, filed on Nov. 12, 2015, which in turn claims priority to Provisional Application Ser. No. 62/078,325, filed Nov. 11, 2014. The contents of all of said applications are hereby incorporated by reference herein in their entirety.

TECHNICAL FIELD

The subject matter described herein relates to configuring software and more particularly to software configuration packages and workflow templates.

BACKGROUND

Software is frequently sold or distributed as a computer product including logic code that has been previously compiled into executable form. Such software products are typically limited in application and use depending on platform, language, and other compiler induced limitations. Certain software products can be shared among a large user base and can have a wide range of uses and applications. To make the software product compatible for a variety of uses and applications, there is often a need for customization to configure the software for use on a particular platform or a specific machine.

Custom configurations typically require the re-writing of the software's logic code. The re-writing of the logic code is time consuming and expensive. It also may result in variations in functionality of the software and make it difficult to maintain. In addition to the above shortcomings, customized software is often static in nature. That is, configuration packages may include a collection of features infused into a static decision service template, which cannot be exposed to a user or administrator for modification. As a result, customized software can remain fixed with respect to certain features and is inflexible with respect to possible use cases.

SUMMARY

Implementations of the current subject matter may include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a computer-readable storage medium, may include, encode, store, or the like one or more programs that cause one or more processors to perform one or more of the operations described herein.

In accordance with various implementations, systems, machines, methods and products for generating a configured software solution using one or more configuration packages are provided. A decision service may be configured to generate decision data based on a configuration package comprising user-generated input, a collection of configurations, and a decision flow template. The user-generated input may be used for selecting an artifact from an artifact library in a configuration database. The collection of configurations may be infused, dynamically, into the decision flow template. The decision flow template may be exposed for user modification. The decision flow template may be integrated into the configuration package in association with at least one configurable decision element and a user configuration selected from the collection of configurations for specifying one or more parameters in the artifact. The artifact and the user configuration may be combined with the decision flow template to generate the configured software solution. Input for the at least one configurable decision element is received. The decision data may be generated based at least on the received input. A consistency check may be performed that verifies that the configured software solution does not violate at least one predetermined rule defined for the software solution.

Computer-implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

DETAILED DESCRIPTION OF EXAMPLE EMBODIMENTS

The details of one or more variations of the subject matter described herein are set forth in the accompanying drawings. The current subject matter is directed to using configuration packages to configure a static computer framework. By using one or more configuration packages tailored to a specific application or task, this allows the framework to be reused with no change in the underlying programming code.

Figure 1:
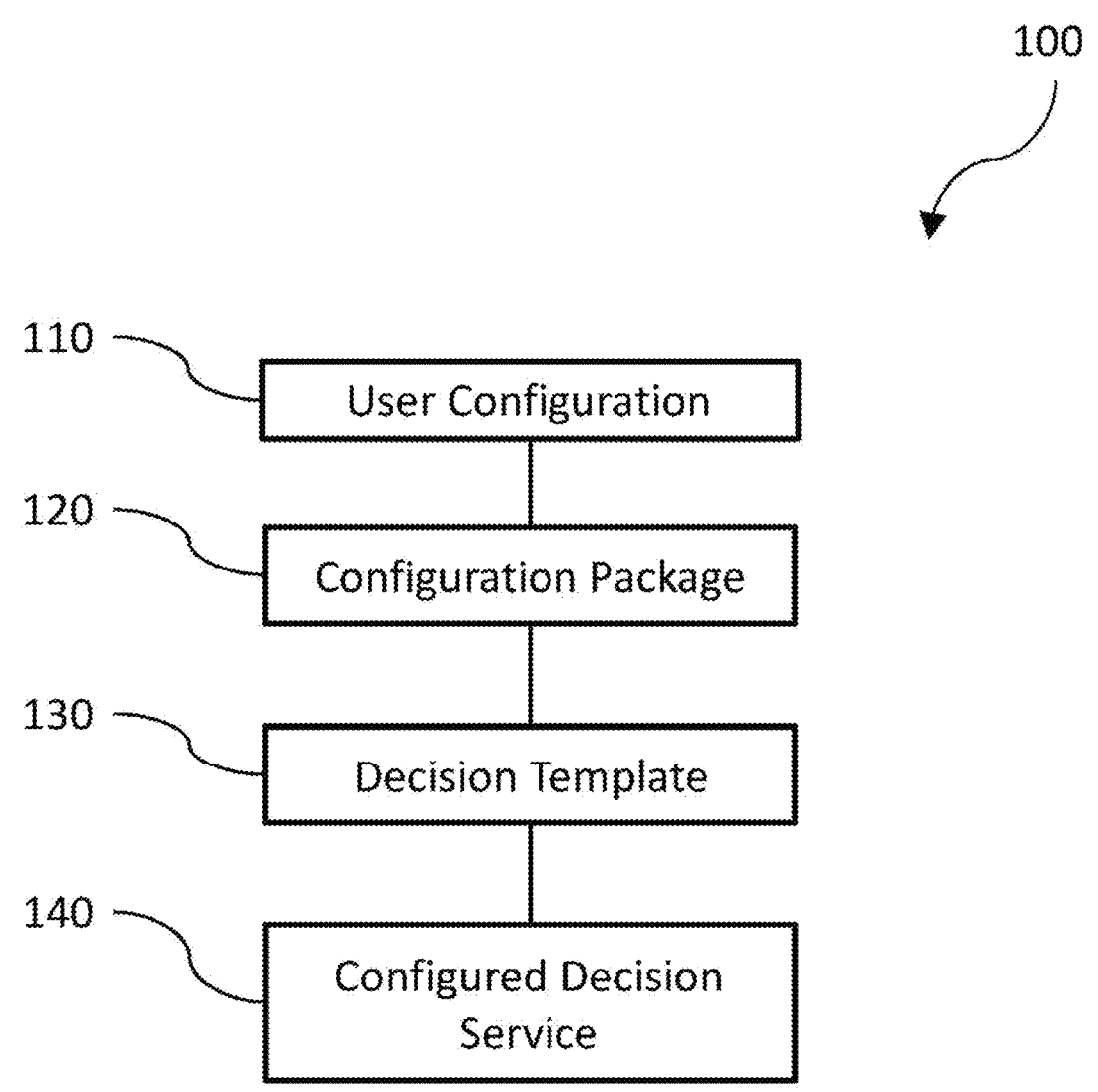
FIG. 1 is a diagram illustrating an example system integrating a user configuration into a configuration package to be used with a decision template.

Referring to FIG. 1, a block diagram illustrating a system 100 is provided. The system 100 may be used to integrate a user configuration 110 into a configuration package 120 to be used with a decision template 130. One or more user configurations 110 may be used with different configuration packages 120, which may be then integrated into the decision template 130 in order to generate a configured decision service 140.

In certain implementations, the decision template 130 may or may not be altered or customized by the user. The configuration package 120 or the user configuration 110 may change from application to application. The decision template 130 may be, for example, a model, a business program, a manufacturing program, a software development program, a decision management program, or any other customizable software or programmable feature of a computing system.

The configuration package 120 may be used with the decision template 130 without having to alter the underlying code of the decision template 130. In at least one implementation, the configuration package 120 may be a preset code package that does not require user input. In another implementation, the configuration package 120 may require limited input from the user, (e.g. the user configuration 110) but still not require any changes to either the configuration package 120 or the underlying code for decision template 130.

By way of a non-limiting example, a user may wish to use the decision template 130 for a particular application. The user may download a corresponding configuration package 120 for the particular application to the computer. Once the configuration package is installed, the user may be prompted for questions to allow the configuration package 120 to interface with the decision template 130. For example, the user may be prompted about the type of application and details about the functionality and workflow. After the decision template 130 has been interfaced with the configuration package 120, the application may then run seamlessly without the user having had to customize the decision template 130, for example.

In some implementations, the user may be also given the option to further customize by also modifying the decision template using workflow components. There may be any number of user configurations 110 and configuration packages 120, or any combination thereof, interfaced with the decision template 130. The decision template 130 may be exposed to the end-user for modification, via a workflow component as provided in further detail herein. The workflow component may be implemented using a workflow engine (e.g., Flowable which is an open-source workflow engine written in Java) that can execute business processes described in Business Process Model and Notation (BPMN). Utilizing BPMN, execution semantics may be introduced into the software code by way of the workflow components alongside existing notational and diagramming elements.

Figure 2A:
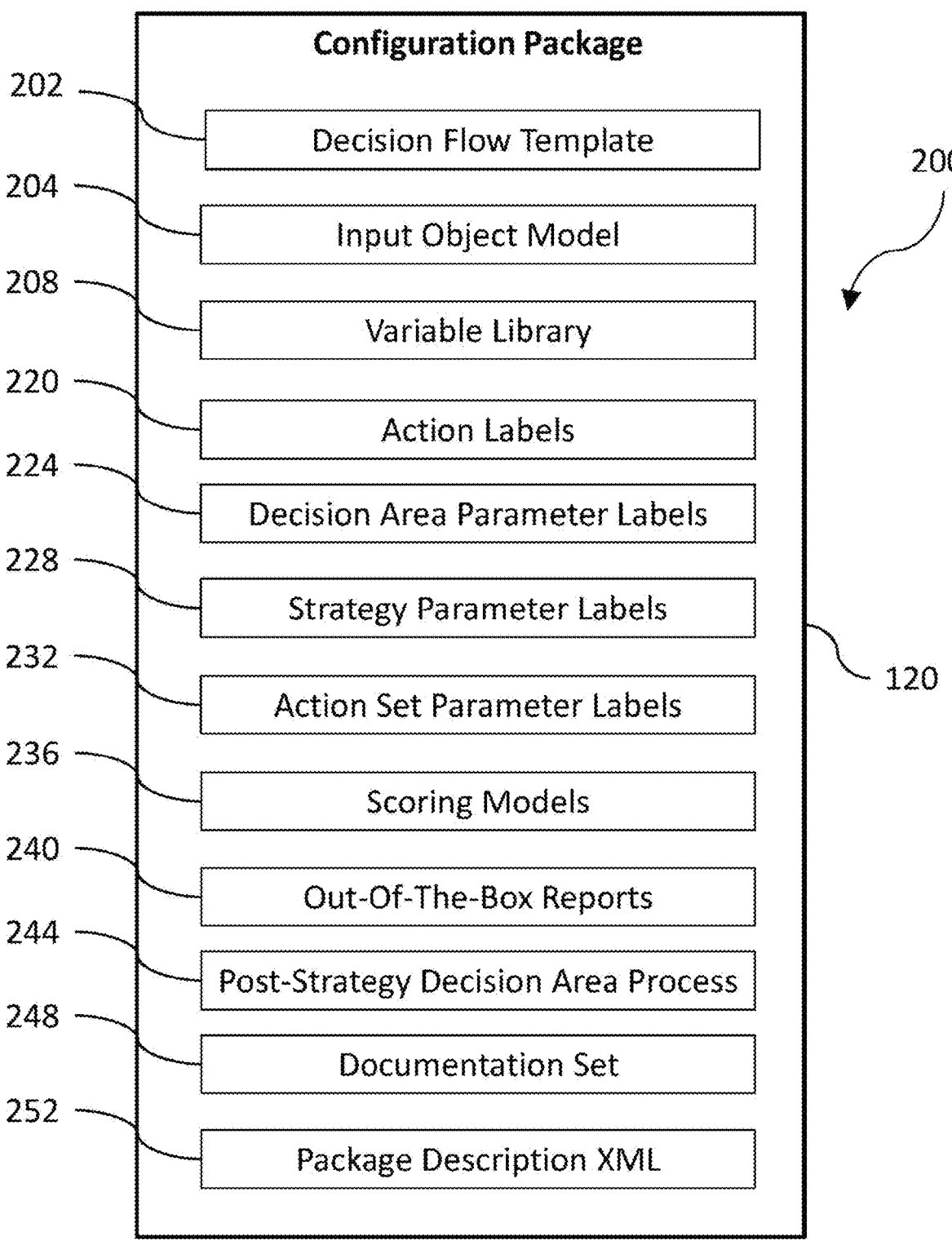
FIG. 2A is a diagram illustrating an example configuration package containing a set of artifacts.

Referring to FIG. 2A, a block diagram 200 of an example configuration package 120 is provided. The configuration package 120 may contain a set of artifacts or programmable objects that allow the configuration package 120 to interface with the decision template 130. The artifacts may be models, libraries, labels, or other logic programming data structures as described below. There may be any number or combination of artifacts in the configuration package 120. The examples below are not intended to limit the number or type of artifacts used with the configuration package 120. The artifacts may be in a number of data formats, by way of example and without limitation, XML, SRL, FSML, XSD, DB strings, MODEL BUILDER PROJECTS, BIRST files, PDF, etc.

In one implementation, there may be an input object model 204 included with the configuration package 120. The input object model 204 may define the entities made available to decision services, such as customer, account, transaction, or in other words the entity of focus, as well as the data elements that comprise them. The definition of "account" may be different for retail banking and, for example, telecom or healthcare or airlines, etc. The input object model 204 for an origination's configuration package 120 may include an application, not an account (though in other implementations it may also include accounts for the cases where the applicant already has accounts with the institution). The entity of focus may be dependent on the domain, and so it may be stored as data inside the configuration package 120, and is not hard-referenced in the code or out-of-the-box data repository structure. The input object model 204 may be stored as an XML (Extensible Mark-up Language) file, or other industry standard method of defining data.

There may be a variable library 208 included with the configuration package 120. Domain-specific solutions may include targeted variables that depend on the input object model 204. Some variables are standard and may be contained in the configuration package 120, and the balance of the library may be user definable, where the user may enter his/her own code through the UI. Variables may also be imported and exported as needed. The variable library may be different for different configuration packages 120. For example, revolving account management will have different needs, terminology and data than telecom.

The former may have variables such as average account balance last 6 months, or maximum account delinquency last 12 months, and the latter may have average long distance minutes last 3 months, etc. Since the variable library 208 may be part of the configuration package 120, when users import the configuration package 120, they may therefore get a domain-specific variable library 208 that matches the input object model 204 (which is also in the configuration package 120). The variable library 208 may be stored as SRL, or "STRUCTURED RULE LANGUAGE," a proprietary language of FAIR ISAAC CORPORATION.

In one implementation, the user configuration 110 may include exclusions. Similar to variables, exclusion logic is a test on the value of a variable (e.g., if Variable A<5 then exclude; otherwise don't). Exclusions in a revolving account management configuration package 120 may include time on books <12 months, or account is more than 3 cycles delinquent, whereas in a telecom configuration package 120, it might be account age <12 months, or service is suspended, etc. Exclusions may be stored as SRL. There may be inclusions included with the user configuration 110. Inclusions are similar to exclusions, above, only based upon variable analysis the variable is included rather than excluded.

By way of introduction to 220, 224, 228, and 232, decision area parameters are holders for values that the decision process will use to make the decision. They are not input fields, but they are indirectly associated with the entity of focus (account, framework, etc.). The entire configuration package 120 is dependent on the entity of focus and the business problem being solved. For example, two configuration packages 120 in banking may have "account" as their entity of focus, but one might focus on checking accounts whereas the other might focus on credit cards. Each may have different decision area parameters. Example parameters provided at different levels may include:

decision area (the values are set when you know what decision area you are doing, e.g. credit line management, fee waiver management, etc.), strategy (the values are set when the strategy is set in the coarse classing step), action set (the values are set in the fine classing step).

These parameters may be implemented in decision frameworks without configuration packages 120, or may be hard-wired into the framework code. The overarching idea is that there are some parameters that are set at each of these three levels. The parameters may be optional and may be referenced in the post-strategy decision area process as provided herein.

The configuration package 120 may include the labels or declarations for the parameters, but not assigned values. The configuration package 120 may contain "cushion amount" and "over limit tolerance," or other threshold values, which are useful parameters to have when making an authorization decision. For example, "application cutoff age" is a useful parameter for an originations decision. The configuration package 120 may not specify what the actual percentage (or whatever) should be set to. The actual values may be set by the clients, and depend, for example, on how aggressive they are (or other factors coming from their strategic analyst roles) and may be subject to adjustment through time as part of champion/challenger testing. Clients set these parameters in the framework's user interface, and they are configuration, not customization.

In one implementation, there may be action labels 220 included with the configuration package 120. Labels may be used to label fields/values specific to a business problem or domain. Labels may also infuse proprietary software into configuration packages 120 by making most common actions and decision input parameters required to solve a business problem available and apparent to the user. For example, in a configuration package 120 for post-hospital discharge decisions, action labels 220 might reflect: nurse visits or doctor visit. In a debt collection setting, an action might recommend blocking the account, or routing to a collections queue. Labels may be stored as plain text in CSV (Comma Separated Values) format. The general features of labels described above may also apply to other types of labels described throughout the framework.

In certain aspects, there may be decision area parameter labels 224 included with the configuration package 120. The decision area parameters, selected by the decision area parameter labels 224, are values made available to the decision process based on the decision area currently in process. Configuration packages 120 may contain multiple decision areas. For example, the configuration package 120 for deposit account decisions in retail banking may include decision areas for overdraft pay/no-pay decisions, fee waiver management, and deposit holds management, whereas the configuration package 120 for telecom may include decision areas for cross-sell, pricing and fee structure, account renewals, etc.

In some embodiments, there may be strategy parameter labels 228 included with the configuration package 120. Strategy parameters, selected by the strategy parameter labels 228, are values made available to the decision process based on the strategy assigned to the entity of focus in the overall decision flow processing. Strategy assignment may occur in a coarse-classing preliminary decision step. In optional embodiments, there may be action set parameter labels 232 included with the configuration package 120.

Action set parameters may be values made available to the decision process based on the action set assigned in the executed strategy. Action sets may be assigned as a subsequent fine-classing decision step.

Depending on implementation, there may be scoring models 236 included with the configuration package 120. Whether and which predictive scoring models are delivered with initial installs is subject to licensing, so scoring models are optionally part of the configuration package 120. Scoring models 236 may be specific to a domain or business problem and may be chosen to include with the configuration package 120. In one implementation, scoring models 236 may be stored in the configuration package 120 as MODEL BUILDER/BLAZE ADVISOR projects, which is a FICO proprietary format. Models may also be stored in PMML (predictive Modeling Mark-Up Language), an industry standard specification of XML used to represent analytic scoring models.

In one example embodiments, there may be out-of-the-box reports 240 included with the configuration package 120. The out-of-the-box reports 240 may enable users to monitor and evaluate performance of the strategies supported by the configuration package 120 and the decision template 130. They may be generated per industry vertical and included in the configuration package 120. Out-of-the-box reports 240 may be stored in any format particular to the reporting package integrated into the decision template 130, for example BIRST, JASPER, or SAP BUSINESS OBJECTS, etc.

Furthermore, there may be a post-strategy decision area process 244 included with the configuration package 120. Following the execution of a strategy, further domain and business problem-specific items may be addressed the post-strategy decision area process 244 of the configuration package 120. By this stage in the process, the decision flow has processed general and decision area exclusions, strategy assignment (coarse classing), generated scores and other needed variables, etc., and performed fine segmentation in the strategy tree. At this point, some decision areas have specific logic that completes the decision processing, for example, credit facilities has logic to calculate the various limits, authorizations determines the accept-or-decline decision, etc. This logic may be stored in the configuration package 120 as SRL.

In one implementation, there may be a documentation set 248 included with the configuration package 120. Specific formats will be established in the development cycle and at the design level, but each package will have the documentation set 248 as a standard set of documents associated with and zipped up with the configuration package 120. The documentation set 248 may be in any format, e.g. MICROSOFT WORD, ADOBE PDF, etc., and describe the elements contained for the end-users.

There may be package description XML 252 included with the configuration package 120 in certain embodiments. A configuration package 120 may have the package description XML 252 document and schema associated with it that will contain meta-data about the configuration package 120 such as domain, date-of-issue, versioning of each element, number and description of each element, etc. The package description XML 252 may be used in package features such as import and export, and may also be useful for customer support.

Figure 2B:
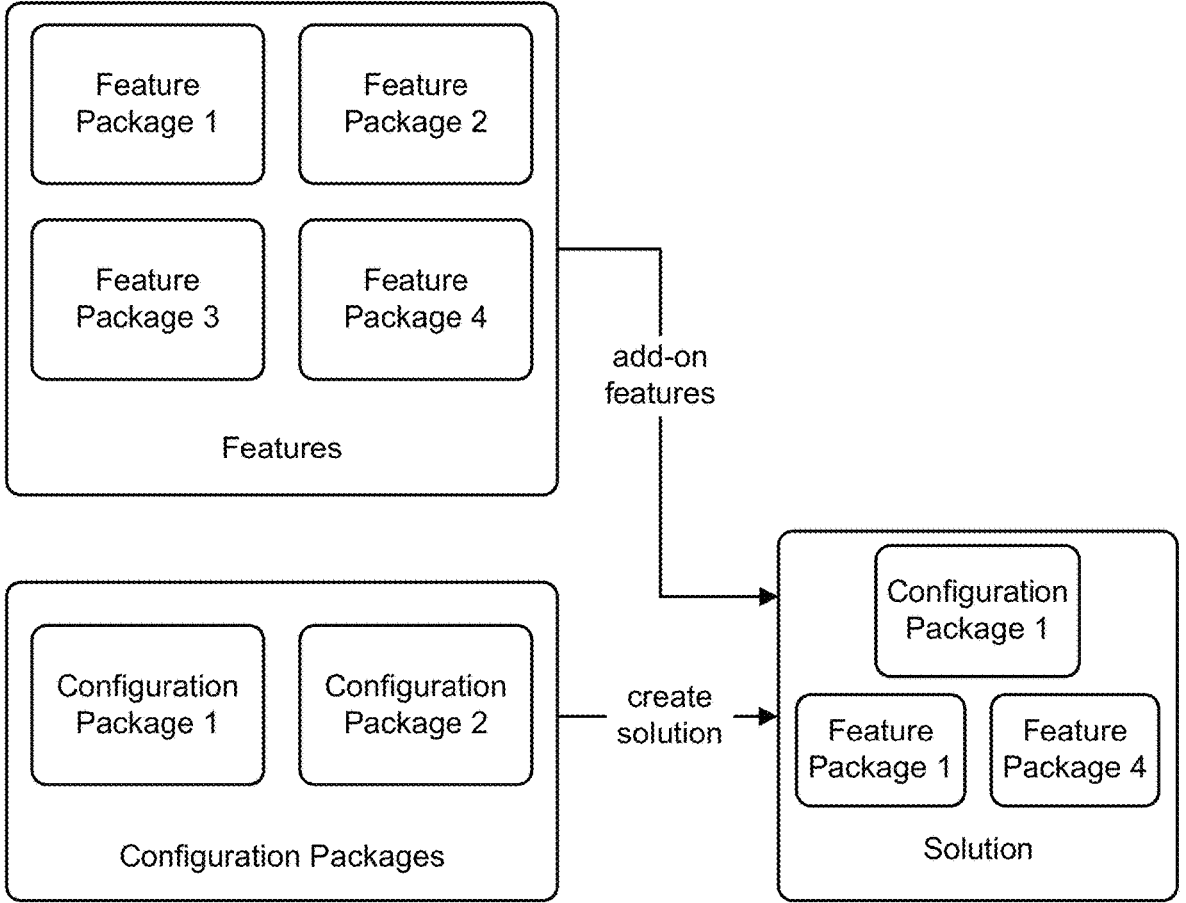
FIG. 2B is a diagram illustrating example feature packages.
Figure 2C:
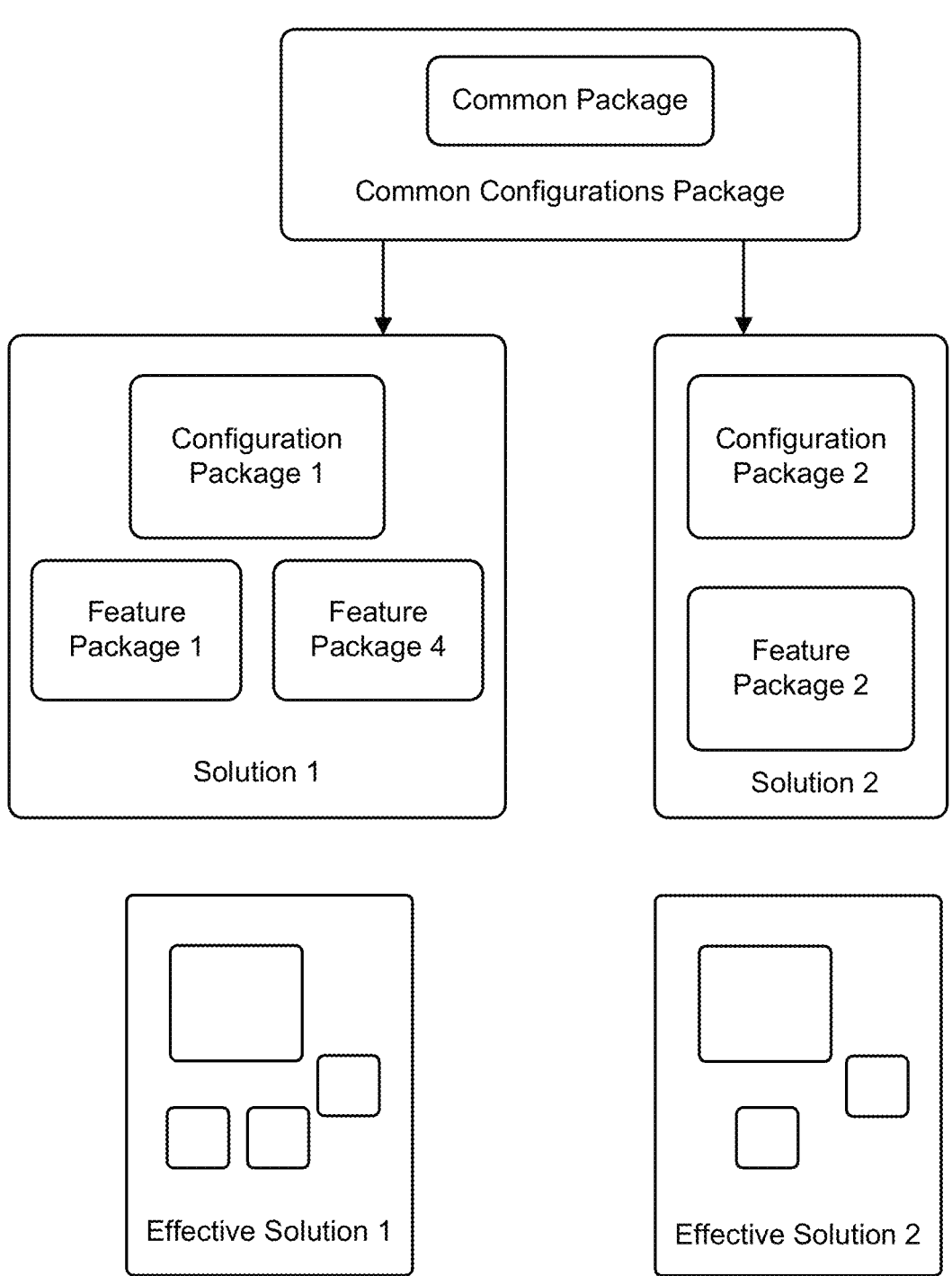
FIG. 2C is a diagram illustrating example custom configurations.

The configuration package 200 may include a collection of configurations which are dynamically infused into the decision template 130, such that the decision template 130 is exposed for user modification. In some variations, the decision template 130 may become an integral part of the configuration package 120 as shown in FIG. 2A-2C. For example, a first configuration package may include first configuration data that is infused into a first decision template, and a second configuration package may include second configuration data that gets exposed into a second decision template (i.e., a different decision flow).

As such, the same software product may be customized for different uses and applications by constructing the second decision template contained in the second configuration package differently in comparison to the first decision template contained in the first configuration package. This implementation provides for additional flexibility for customizing a configuration package itself and significantly increases the scope of use of the software product across a plurality of applications.

By way of example and without limitation, a decision template originally designed to determine credit card related decision flows (e.g., transaction approvals, credit line increases, collections actions, etc.) may be easily and dynamically customized by modifying feature packages and introducing custom configurations. For example, the original template may be reconfigured and further customized to handle loan and credit card applications in a flexible manner to manage decision flows for long-running tasks using a workflow component. The workflow component open up the decision flow by providing additional features, configuration packages, or both.

Referring to FIG. 2B, an implementation that provides for additional feature packages is shown. In this implementation, the software product may be configured to apply to various solutions by way of multiple feature packages (e.g., feature packages 1 through 4). Additional configuration packages (e.g., custom configuration packages 1 and 2) may be also added on top of the custom feature packages.

Referring to FIG. 2C, custom configurations assets may be designed and implemented that apply to multiple solutions. As shown, custom feature packages may be also added on top of configuration packages. In this manner, finely tuned and highly customizable solution packages may be implemented for one or more specific applications, where a configuration package includes a decision flow template, an object model, a variable library, one or more decision area definitions, and a scoring model. Once a configuration package is received, it may be modified or extended using a workflow tool in the same manner as other configuration package elements may be extended in the user interface.

In certain embodiments, the configuration package may be further extended to include a checklist of capabilities. Such capabilities may, for example, be associated with related data management platform (DMP) services or one or more microservices. These are example services that a user or programming engineer may have access to by way of a provided user interface (UI) and would provide for collecting and managing data used to implement generic or specific software solutions for particular use or clients.

DMP, as used herein, refers to a software platform that, for example, provides for identifying audience segments or selecting specific users and contexts (e.g., in an online advertising campaign). Optionally, a DMP in accordance with one or more aspects may use big data and artificial intelligence algorithms to process and analyze large data sets about users from various sources. Advantageously, using a DMP, data may be organized efficiently and additional insights on audiences and markets may be obtained. A DMP, as implemented in accordance with certain embodiments, may be also utilized to manage data privacy concerns in case of the integration of third-party software with private data.

Microservices, as used herein, refer to a variant of service-oriented architecture (SOA) that may be utilized to arrange a software application as a collection of loosely-coupled services. Using the microservices architecture, as proposed herein, services may be fine-grained and include processes that communicate over a network to provide a solution based on technology-agnostic protocols (e.g., the HTTP protocol) and a variety of programming languages, databases, or alternative hardware and software environments. Depending on implementation, microservices may be messaging-enabled, bounded by context, and independently deployable over centralized or decentralized (e.g., block-chain) computing platforms.

In some implementations, DMP services or microservices may be made available (e.g., turned on) by way of a features included in a configuration package. In this manner, configuration packages may provide optional services and features that may be turned on or off, depending on user required functionality and/or specifically defined contexts. A configuration package may also indicate that the users of a customized solution (e.g., a solution generated from the particular configuration package) should have access to, for example, operational data store (ODS) services, application delivery management (ADM) services, batch services, real-time decision services, reporting services, etc.

An ODS services database may be designed, in certain aspects, to integrate data from multiple sources for additional operations on the data, for reporting, controls and operational decision support. The data may be passed for further operations and to the data warehouse for reporting. ADM may be, for example, used to manage, monitor, and troubleshoot the global application delivery infrastructure from a single, unified console.

ADM services may be further used to address application visibility challenges by collecting detailed information about web-application and virtual-desktop traffic (e.g., application flow, security events, user-session-level information, webpage performance data, and database information) flowing through a managed appliance (e.g., Citrix Appliances). Actionable reports may be generated based on the collected information to enable efficient and proactive trouble shooting.

Regardless of the type or nature of services used, in one or more embodiments, the list of capabilities may be determined by the suitability of the available services to the use case and use context supported by the configuration package being deployed. For monetization, the configurable capabilities may be also tied to customer contractual agreements and provider obligations. As noted herein and above, the customized configurations and features may be activated or deactivated (turned on/off) by the virtue of controlling the implemented services.

In one or more embodiments, business applications and solutions may be generated and deployed at the design time configuration such that the users and client calling systems have access to the deployed solution. The UI may rely on a workflow execution engine (e.g., Flowable) when managing process execution and data persistence. For example, Flowable may provide pre-built constructs to enable users to assemble business processes. These constructs may include events, gateways, tasks, call activities, and sub-processes, for example. Flowable may be embedded as part of a process execution service through a configured process data service (e.g., provided by a BPMN engine). There may be distinct tasks to persist and query data, each configurable separately as per the defined rules or requirements.

In certain aspects, workflow feature may be implemented and exposed such that one or more microservices may specify an associated configuration component. In some embodiments, a solution editor may be implemented and integrated as a microservice with a microfrontend to provide users with options to build a workflow for application processing or other business processes as needed for a particular use case. One or more of the following constructs may be used to build a business process or subprocesses:

Gateways

Tasks

Call Activities

Sub-processes

Dup checks

External web service calls

In an example embodiments, when the user publishes the changes, the design time aspects of the workflow are stored in a content management system (CMS) and runtime information is saved in a Flowable database. Flowable, not having a notion of versioning, versions of process definitions are created in the engine as a part of deployment. During deployment, Flowable assigns a version to the process definition before storing the runtime information in the Flowable database.

Figure 3:
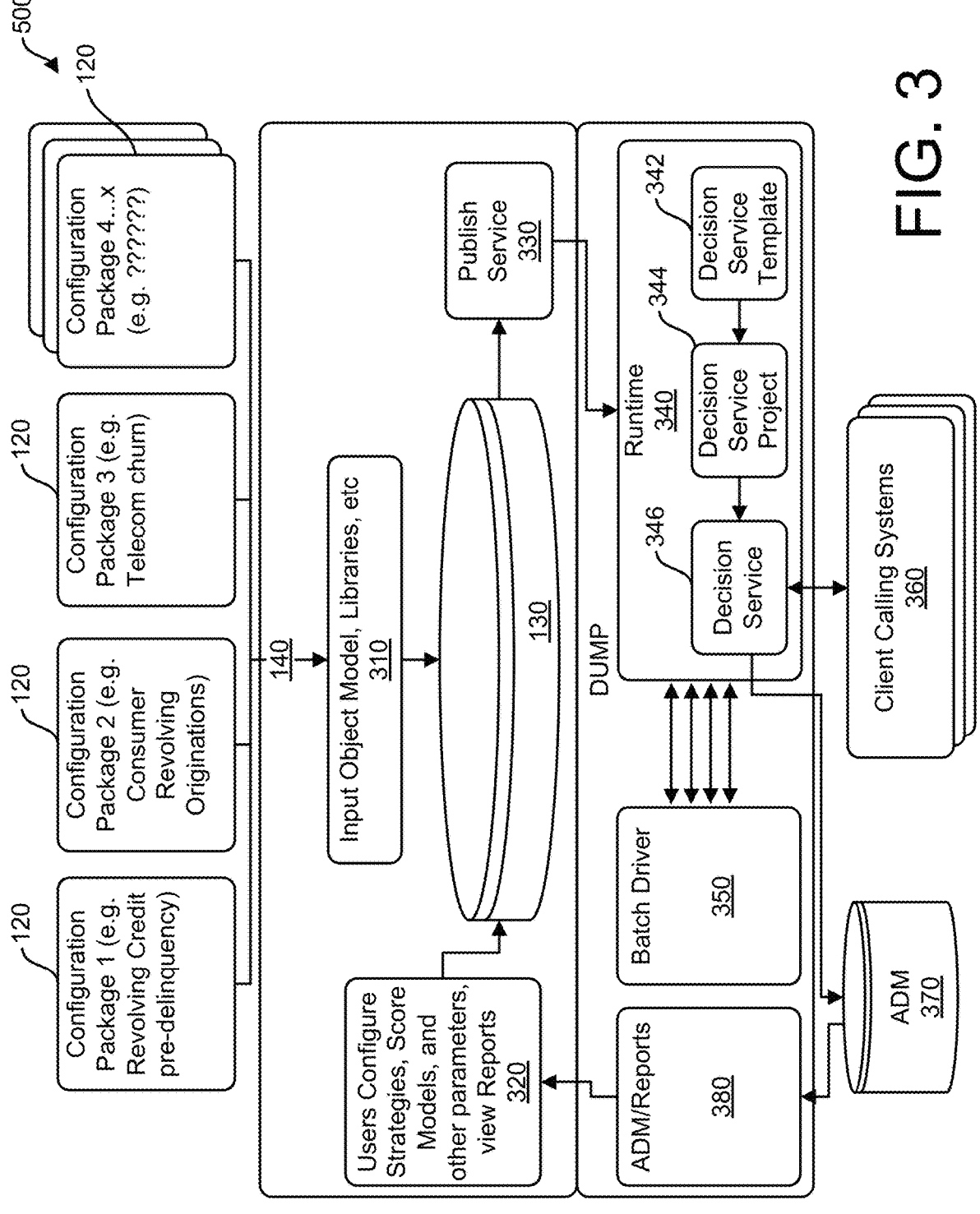
FIG. 3 is a process flow diagram illustrating multiple configurations packages integrated into a decision template.

Referring to FIG. 3, a process flow diagram 300 is illustrated having multiple configurations packages 120 integrated into the decision template 130. In the implementation shown, the configuration packages 120 may be accumulated into a set of configuration packages 310 that include, for example, input object models, libraries, etc. Then, the configuration packages 120 may be integrated with the decision template 130, to form a configured service decision 140. In the example shown in FIG. 3, the configuration packages 120 are added to a Strategy Director framework to form the configured Strategy Director.

At 320, users may configure strategies, score models, and other parameters. Users may also view reports or perform other operations or tasks. At 330, the service may be published to another program, in this case the DECISION MANAGEMENT PLATFORM (DMP). Details regarding DMP may be found, for example, in U.S. Pat. App. Ser. No. 61/928,951, the contents of which are hereby fully incorporated by reference. At 340, during runtime of the DMP, a decision service template 342 may be loaded into a decision service project 344 to render a decision service 346. At 350, batch drivers may be loaded for use by the DMP during 340.

At 360, a client calling system may be used to contact clients for implementation of decisions reached by the DMP. At 370, the results of the decisions made with the DMP may be sent to the ANALYTIC DATA MART (ADM). The ADM is a data repository that is output by processing customer data through the aggregated decision template 130 configured with the configuration packages 120. The ADM contains the values calculated by the system on all relevant artifacts of the configuration package 120, e.g. input data, variables, etc. At 380, reports from the ADM may be put back into the DMP for later use by the DMP or for using configuring the decision template 130, as described in 320, above.

Figure 4:
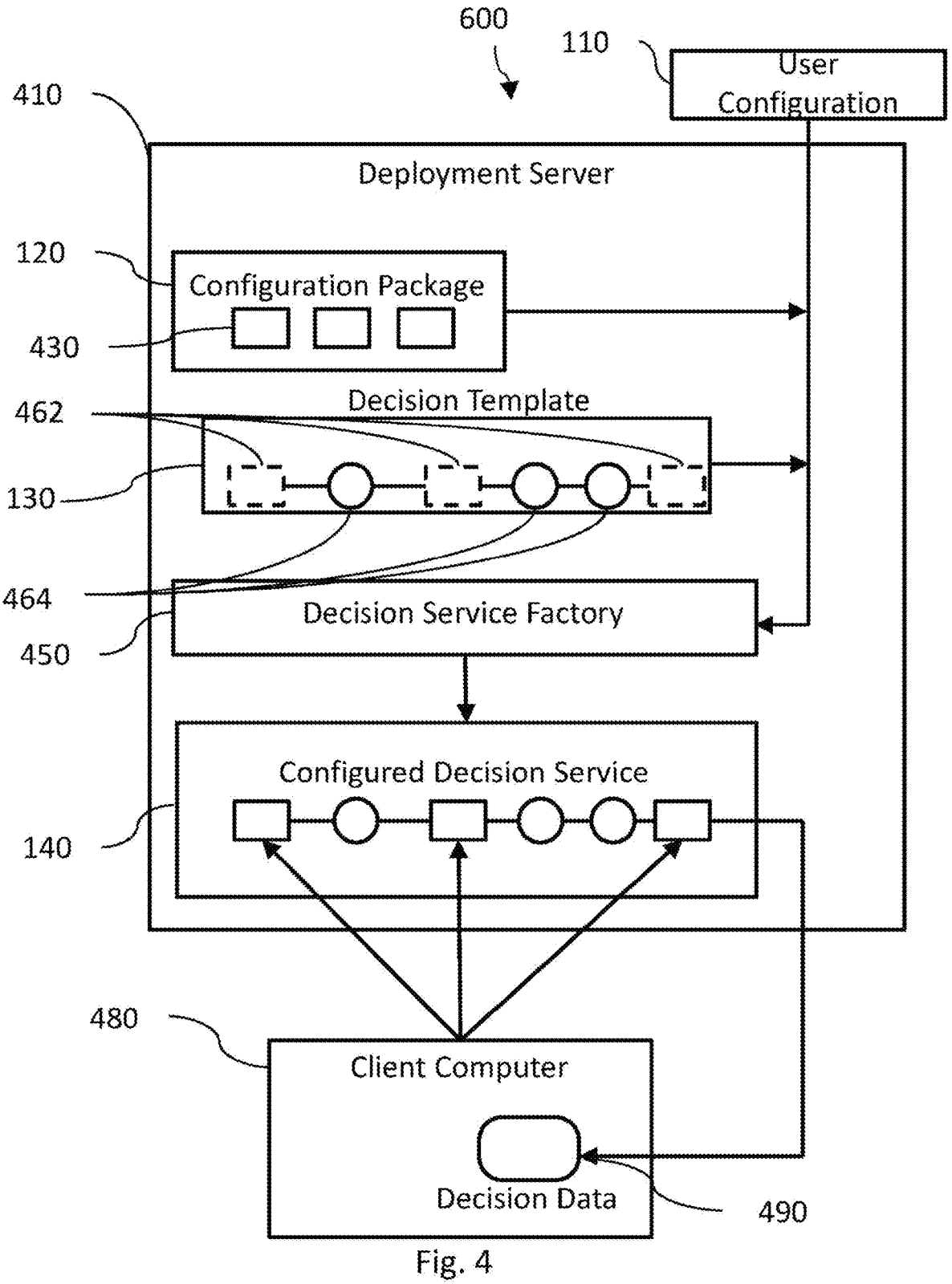
FIG. 4 is a diagram illustrating a configuration package configuring a framework for generating decision data by a decision service.

FIG. 4 is a diagram 400 illustrating a configuration package 120 configuring a decision template 130 for generating decision data 490 by a configured decision service 140. The configured decision service 140 may be called from, or exported to, a client computer 480 in order to provide decision data 490 based on what specifically the configured decision service 140 is asked to analyze. Once the configured decision service 140 is configured by the configuration package 420 and the user configuration 110 to accept certain types of data and make certain logical decisions, the configured decision service 140 may accept specific input, for example from a client computer 480 and provide decision data 490.

As one example, a simple decision service could determine if a bank fee should be waived. The decision template 130 for making a decision about the fee could be based on two elements, with each element having a weighting depending on the type of element chosen. Accordingly, the decision template 130 could have two configurable decision elements and two non-configurable elements (the weightings). A user could implement the configuration package 420 to select, via the user configuration 110, the two configurable decision elements.

The configurable decisions elements, for example, may be: (1) an existing account balance and (2) the amount of the fee. The non-configurable decision elements may be determined based on the selected configurable decision elements. Once configured, the decision service 450 may accept input from a client computer 480 that specifies a certain account balance and fee amount. The decision service 450 could then, using the configured framework 460, generate the decision data 490 (waive or not waive) based on the specific input given to the configured framework 460.

As shown in FIG. 4, a configuration package 420 may include any number of artifacts 430 or references to artifacts 430 from an artifact library in a configuration database. As described above, the artifacts 430 may represent a data type (or input object model), logical operations or quantities that have to be determined at run-time (variables), scoring models, etc. The artifacts 430 may accordingly correspond to an input or an input type received by the configured decision service 140 from an external source, such as a client computer 480.

A decision service factory 450 may receive the configuration package 420 from within the deployment server 410 or from a remote computing system separate from the deployment server 410. The decision service factory 450 may be a code module that accepts the artifacts 430 in the configuration package 420 and distributes or transmits the artifacts 430 to the appropriate location in the decision template 460. As discussed above, the configuration package 420 may be configured based on user-generated input and/or the user configuration 110, further configuring the configured decision service 140.

The decision service factory 450 may also receive the decision template 130 and the user configuration 110. The user configuration may specify a parameter, for example a particular feature, in one or more of the artifacts 430. The artifacts 430 specified by the configuration package 120 may be combined with the user configuration 110 and the decision template 130 to generate the configured decision service 140. The decision service factory 450 and the configured decision service 140 may be located in any computing system, for example, in a deployment server 410 that distributes configured decision services 140, in a remote system, etc.

As noted herein and above, the decision template 130 may include one or more configurable decision elements 462 and one or more non-configurable decision elements 464. The simple linear sequence shown in FIG. 4 is intended to be by way of example and non-limiting. The order of the decision elements may vary and there may be any number of decision elements connected to a given decision element.

In one implementation, once the configured decision service 140 is completed, there may be a consistency check to ensure that the configuration of the configured decision service 140 is consistent or does not violate any predetermined rules. For example, the consistency check could determine if, as a result of the user configuration 110 applied to the configuration package 120, the configured framework 460 would enter into a loop or have an invalid output when calculating the decision data 490. If a violation is detected, an error message may be generated that describes the violation. The error message may then be transmitted to another computer, displayed on a graphical user interface, or otherwise communicated to one or more users or connected computing systems.

The configured decision service 140 may receive, from a client computer 480, input for the configurable decision elements. The input may be specific data of the type that is required by the configured decision service 140. For example, if a configured element is an account balance, the input for that configured element could be a numerical value corresponding to the account balance for a particular account.

Once the input has been received by the configured decision service 140, the configured decision service 140 may generate decision data 490 based on the received input, and the non-configurable decision elements 464. The decision data 490 may be, for example, a binary "yes/no" decision, a score, a probability, a recommendation, a combination of a number of such entities, etc. The generated decision data 490 may then be transmitted to the client computer 480 or any number of connected computing systems.

In one implementation, the configured decision service 140 or the decision template 130 may be transferred to a remote computing system. Such publishing of data may enable the remote computing system to locally implement the configured decision service 140 without requiring a connection to the deployment server 410.

In another implementation, the configurable decision elements may be updated in response to changes in artifacts 430 received by the decision service factory 440. The updating may be based on a user optimizing the artifacts 430 that go into the decision template 130 in order to improve accuracy of generated decisions.

In yet another implementation, the input may be received by calls to the client computer 480 as it runs a web service. In this way, both the configuration package 120, and the input originating from the client computer 480, may be managed by one or more client-side computing systems. Also, the web service may enable use of the decision service 450 via graphical user interfaces, browsers, and so on, from a single networked computer.

One or more aspects or features of the subject matter described herein may be realized in digital electronic circuitry, integrated circuitry, specially designed framework 460 specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software frameworks, frameworks, components, or code, include machine instructions for a programmable processor, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well.

For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented system for configuring an extensible software solution, the system comprising one or more integrated circuit processors for controlling operations comprising:

configuring a packaging service to generate configuration data based on data stored in a plurality of templates including at least one of:

a first template associated with a first object that is importable into the first template from a first repository based on a first user selection from a plurality of objects included in the first repository, and a second template associated with a second object that is importable into the second template from the first repository based on a second user selection from the plurality of objects included in the first repository, at least the first object being definable or modifiable by a user;

providing the user with option to, using the packaging service, select or modify data in one or more of the plurality of templates for integrating at least one of the first template and the second template into a first configuration package, wherein the first configuration package further includes a variable library comprising one or more of standard variables or user-definable variables to facilitate code interoperability over multiple platforms, and wherein the first configuration package is forwarded to a remote deployment server for execution, responsive to the user having the option to select or modify data in the one or more of the plurality of templates; and configuring an extensible software solution based on the first configuration package subject to one or more predefined rules, the extensible software solution being deployable for execution, responsive to a consistency check process to confirm the one or more predefined rules are not violated.

2. The computer-implemented system of claim 1, wherein the user selects the first object from the first repository for integration into the first configuration package.

3. The computer-implemented system of claim 2, wherein a user configuration is selected from a collection of configurations for specifying inclusion or exclusion of one or more capabilities for the first object.

4. The computer-implemented system of claim 1, wherein modification of capabilities of the extensible software solution is achieved by configuring data included in at least the first configuration package without modification of logic code associated with the extensible software solution.

5. The computer-implemented system of claim 1, wherein the extensible software solution is generated based on selecting the first configuration package from a set of configuration packages stored in a configuration repository.

6. The computer-implemented system of claim 1, wherein the first configuration package is forwarded to a remote deployment server for execution, eliminating a need for code customization and instead enabling user reconfiguration of the extensible software solution's capabilities.

7. The computer-implemented system of claim 1, further comprising importing a predefined object into at least one of the first template or the second template.

8. The computer-implemented system of claim 1, wherein at least one of the first template or the second template comprises a user-configurable capability.

9. The computer-implemented system of claim 1, wherein at least one of the first template or the second template comprises at least one non-configurable capability.

10. The computer-implemented system of claim 1, wherein the extensible software solution is deployed, in response to determining that the extensible software solution complies with the one or more predefined rules.

11. A computer-implemented method for configuring an extensible software solution, the method comprising:

configuring a packaging service to generate configuration data based on data stored in a plurality of templates including at least one of:

a first template associated with a first object that is importable into the first template from a first repository based on a first user selection from a plurality of objects included in the first repository, and a second template associated with a second object that is importable into the second template from the first repository based on a second user selection from the plurality of objects included in the first repository, at least the first object being definable or modifiable by a user;

providing the user with option to, using the packaging service, select or modify data in one or more of the plurality of templates for integrating at least one of the first template and the second template into a first configuration package, wherein the first configuration package further includes a variable library comprising one or more of standard variables or user-definable variables to facilitate code interoperability over multiple platforms, and wherein the first configuration package is forwarded to a remote deployment server for execution, responsive to the user having the option to select or modify data in the one or more of the plurality of templates; and configuring an extensible software solution based on the first configuration package subject to one or more predefined rules, the extensible software solution being deployable for execution, responsive to a consistency check process to confirm the one or more predefined rules are not violated.

12. The computer-implemented method of claim 11, wherein the user selects the first object from the first repository for integration into the first configuration package.

13. The computer-implemented method of claim 12, wherein a user configuration is selected from a collection of configurations for specifying one or more capabilities for the first object.

14. The computer-implemented method of claim 11, wherein modification of capabilities of the extensible software solution is achieved by configuring data included in at least the first configuration package without modification of logic code associated with the extensible software solution.

15. The computer-implemented method of claim 11, wherein the extensible software solution is generated based on selecting the first configuration package from a set of configuration packages stored in a configuration repository and the first configuration package is forwarded to a remote deployment server for execution, wherein at least one of the first template or the second template comprises at least one of a user-configurable capability or a user non-configurable capability, the extensible software solution being deployed, in response to determining that the extensible software solution complies with the one or more predefined rules.

16. A computer program product comprising a non-transitory machine-readable medium storing instructions that, when executed by at least one programmable processor, cause the at least one programmable processor to perform operations comprising:

configuring a packaging service to generate configuration data based on data stored in a plurality of templates including at least one of:

a first template associated with a first object that is importable into the first template from a first repository based on a first user selection from a plurality of objects included in the first repository, and a second template associated with a second object that is importable into the second template from the first repository based on a second user selection from the plurality of objects included in the first repository, at least the first object being definable or modifiable by a user;

providing the user with option to, using the packaging service, select or modify data in one or more of the plurality of templates for integrating at least one of the first template and the second template into a first configuration package, wherein the first configuration package further includes a variable library comprising one or more of standard variables or user definable variables to facilitate code interoperability over multiple platforms, and wherein the first configuration package is forwarded to a remote deployment server for execution, responsive to the user having the option to select or modify data in the one or more of the plurality of ten plates; and configuring an extensible software solution based on the first configuration package subject to one or more predefined rules, the extensible software solution being deployable for execution, responsive to a consistency check process to confirm the one or more predefined rules are not violated.

17. The computer program product of claim 16, wherein the user selects the first object from the first repository for integration into the first configuration package.

18. The computer program product of claim 17, wherein a user configuration is selected from a collection of configurations for specifying one or more capabilities for the first object.

19. The computer program product of claim 16, wherein modification of capabilities of the extensible software solution is achieved by configuring data included in at least the first configuration package without modification of logic code associated with the extensible software solution.

20. The computer program product of claim 16, wherein at least one of the first template or the second template comprises at least one of a user-configurable capability or a user non-configurable capability and the extensible software solution is deployed responsive to the one or more predefined rules.

\* \* \* \* \*